US012268566B1

(12) United States Patent
Zhang

(10) Patent No.: US 12,268,566 B1
(45) Date of Patent: Apr. 8, 2025

(54) ELECTRIC TOOTHBRUSH HEAD AND ELECTRIC TOOTHBRUSH

(71) Applicant: Jianhua Zhang, Huizhou (CN)

(72) Inventor: Jianhua Zhang, Huizhou (CN)

( * ) Notice: Subject to any disclaimer, the term of this patent is extended or adjusted under 35 U.S.C. 154(b) by 0 days.

(21) Appl. No.: 18/882,489

(22) Filed: Sep. 11, 2024

(51) Int. Cl.
*A61C 17/34* (2006.01)
(52) U.S. Cl.
CPC .................. *A61C 17/3481* (2013.01)
(58) Field of Classification Search
CPC ..... A46B 5/002; A46B 5/0095; A46B 13/023; A61C 17/222; A61C 17/32
See application file for complete search history.

(56) References Cited

U.S. PATENT DOCUMENTS 11,872,098 B1 * 1/2024 Huang ................ A61C 17/225

FOREIGN PATENT DOCUMENTS

CN 113017892 A * 6/2021

* cited by examiner

*Primary Examiner* — Shay Karls

(57) ABSTRACT

An electric toothbrush brush head and an electric toothbrush are provided. The brush head has a rod portion extending thereof, a driving shaft of the electric toothbrush is inserted into a groove formed at the rod portion, and the rod portion and the driving shaft have first and second limiting portions to fix the position. When an electric motor core inside the electric toothbrush is activated to drive the driving shaft to generate high-frequency motion, the bristles on the brush head can brush teeth. As the driving shaft in this scheme is in contact with the rod portion which is a part of the brush head and extending from the head portion, therefore, the vibration of the driving shaft can be directly transmitted to the head portion.

18 Claims, 13 Drawing Sheets

ELECTRIC TOOTHBRUSH HEAD AND ELECTRIC TOOTHBRUSH

FIELD OF THE INVENTION

The present invention relates to the field of electric toothbrush technology, especially to an electric toothbrush head and an electric toothbrush having same.

BACKGROUND OF THE INVENTION

An electric toothbrush can drive a brush head thereof to produce a high-frequency movement through a rapid rotation or vibration of a motor core, so that toothpaste can be quickly decomposed into fine foam, and teeth can be thoroughly cleaned. In order to extend a service life of an electric toothbrush, a brush handle with a driving shaft at the end and the brush head with bristles is usually detachably connected, so that when the bristles on the brush head deform severely, the brush head can be replaced.

The existing brush heads are generally connected to the driving shafts through connectors. Specifically, both the brush head and the connector are internally hollow. When installing, the connector is fixed inside the brush head, and then the driving shaft is fixed inside the connector to fix the brush head on the driving shaft. However, this connection will cause the vibration of the driving shaft to be not directly transmitted to the brush head, vibration will be hindered and attenuated by the connector during transmission, thereby affecting the vibration frequency of the bristles.

SUMMARY OF THE INVENTION

(1) Solved Technical Problem

To solve the above problems, the present invention provides an electric toothbrush head and an electric toothbrush, which can directly transmit the vibration of the driving shaft to the head portion.

(2) Technical Solution

To achieve the above objectives, the present invention provides the following technical solution:

In one aspect, an electric toothbrush head for connecting a driving shaft of an electric toothbrush is provided. The driving shaft has a first limiting portion. The electric toothbrush head includes a head portion having bristles, and a rod portion extending from the head portion. The rod portion is provided with a groove. The electric toothbrush further includes a plug engaged with the rod portion. The plug includes a through hole in communication with the groove, and an elastic arm, the elastic arm forming partial side wall of the groove, and the elastic arm having a second limiting portion configured for matching with the first limiting portion in a manner that when the driving shaft passes through the through hole of the plug and is inserted in the groove, the first limiting portion is fitted with second limiting portion.

In another aspect, another electric toothbrush head for connecting a driving shaft of an electric toothbrush is provided. The electric toothbrush head includes a head portion having bristles, and a rod portion extending from the head portion. The rod portion is provided with a groove. The electric toothbrush further includes a shell sleeved outside of the rod portion and secured with the rod portion, and a plug inserted into a lower end of the shell and secured with the shell. The plug includes a through hole in communication with the groove, and an elastic arm, the elastic arm forming partial side wall of the groove. The groove is configured for being connected to the driving shaft passing through the through hole, and the groove and the elastic arm cooperatively forms a limit for obstructing the driving shaft to move in the groove.

In further another aspect, an electric toothbrush is provided, the electric toothbrush includes a handle and an electric toothbrush brush head, wherein a driving shaft being provided on the handle, and the electric toothbrush head is detachably connected to the driving shaft.

(3) Beneficial Effects

Compared with the prior art, the present invention brings the following beneficial effects:

In actual use, the driving shaft is inserted into the groove of the rod portion, and the relative position of the rod portion and the driving shaft is fixed through the matching connection of the first and second limiting portions. Then, the electric motor core inside the electric toothbrush is started to drive the driving shaft to generate high-frequency motion, which can enable the bristles on the head portion to brush teeth. As the driving shaft in present scheme is directly in contact with the rod portion, which is a part of the brush head, the vibration of the driving shaft can be directly transmitted to the head portion. The vibration transmission process is not hindered by other components, and there is no attenuation or less attenuation, so the vibration frequency of the bristles is not affected or less affected than the existing electric toothbrushes on the market, resulting that the vibration frequency of bristles is higher. Overall, by using the electric toothbrush head, the vibration of the driving shaft can be directly transmitted to the head portion.

Figure 1:
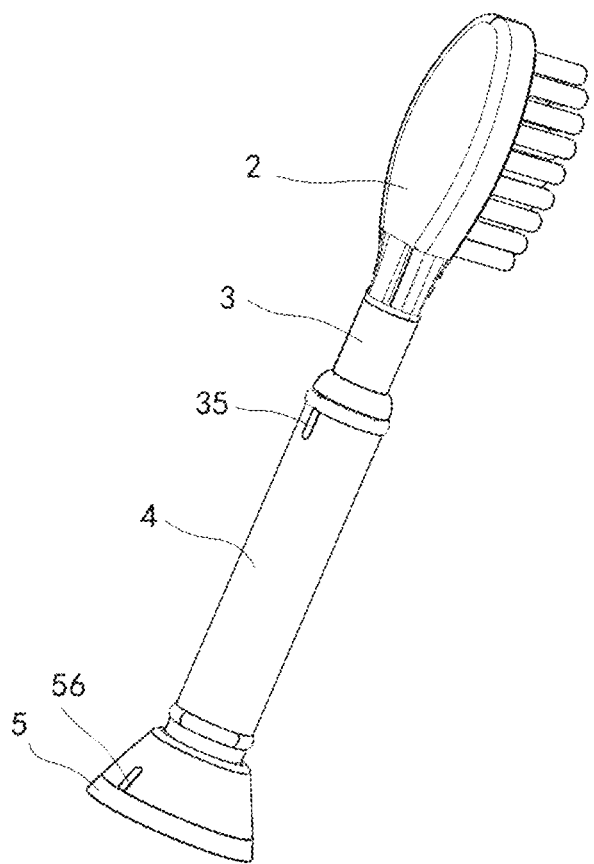
FIG. 1 is a schematic structural view of an electric toothbrush head according to an embodiment of present invention.
Figure 2:
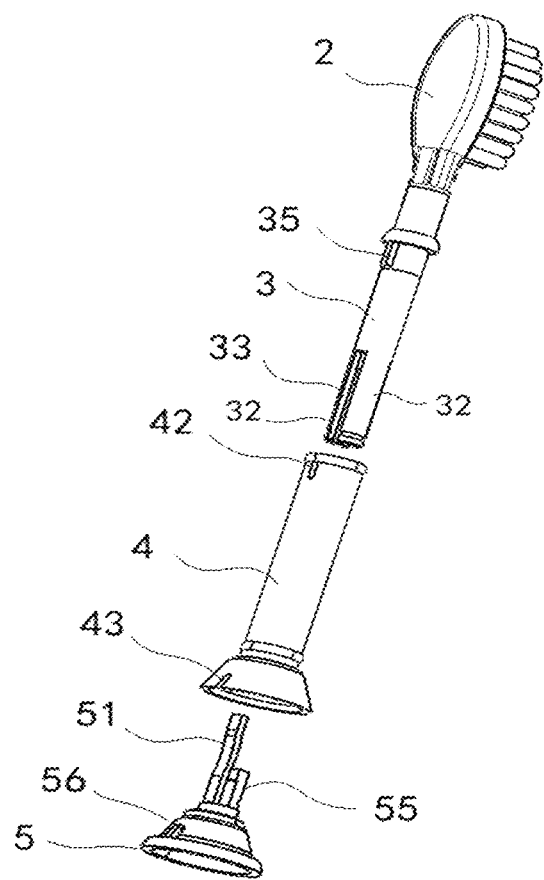
FIG. 2 is an exploded view of the electric toothbrush head of FIG. 1.
Figure 3:
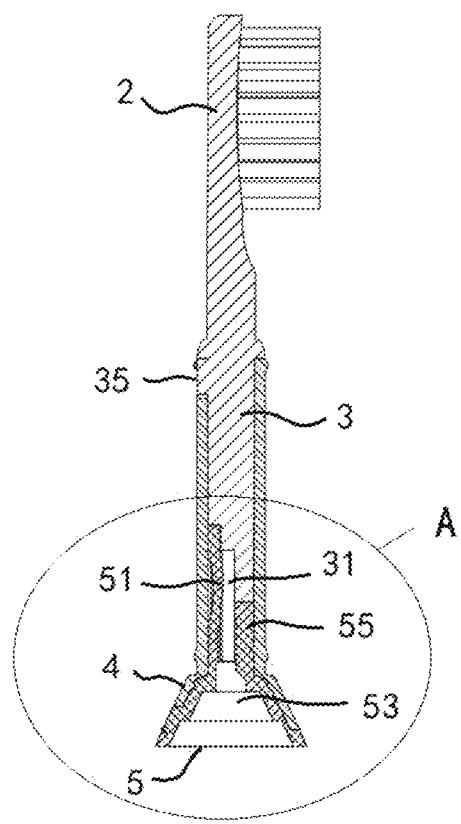
FIG. 3 is a cross sectional view of the electric toothbrush head of FIG. 1.

Labels in the drawing: 1, handle; 2, head portion; 3, rod portion; 4, shell; 5, plug; 10, driving shaft; 11, first limiting portion; 31, groove; 32, elastic wall; 320, second engaging groove; 33, first opening; 34, second opening; 35, first positioning protrusion; 410, first engaging protrusion; 411, first engaging groove; 42, first positioning groove; 43, second positioning groove; 51, elastic arm; 52, second limiting portion; 53, through hole; 55, clamping column; 56, second positioning protrusion; 57, second engaging protrusion.

DETAILED DESCRIPTION OF PREFERRED EMBODIMENTS

The following will provide a clear and complete description of the technical solution in the embodiments of the present invention, in conjunction with the accompanying drawings. Obviously, the described embodiments are only a part of the embodiments of the present invention, not all of them. Based on the embodiments in the present invention, all other embodiments obtained by ordinary technicians in the art without creative labor fall within the scope of protection of the present invention.

Referring to FIGS. 1-9, and FIG. 12-13, an electric toothbrush head is provided for connecting a driving shaft 10 (see FIG. 12) of an electric toothbrush. The electric toothbrush head includes a head portion 2 having bristles, and a rod portion 3 extending from the head portion 2. The rod portion 3 extends a distance between the head portion 2 and the driving shaft 10. The driving shaft 10 has a first limiting portion 11, the rod portion 3 has a groove 31, the groove 31 is equipped with an elastic arm 51, the elastic arm 51 has a second limiting portion 52, when the driving shaft 10 is inserted into the groove 31, the second limiting portion 52 is fitted with the first limiting portion 11.

In actual use, first insert the driving shaft 10 into the groove 31 and fix the relative position between the rod portion 3 and the driving shaft 10 through the matching connection of the first limiting portion 11 and the second limiting portion 52. Then, start the motor core inside the electric toothbrush to drive the driving shaft 10 to generate high-frequency motion, which can enable the bristles on the head portion 2 to brush teeth. As the driving shaft 10 in present scheme is directly in contact with the rod portion 3, which is a part of the brush head, therefore, the vibration of driving shaft 10 can be directly transmitted to the brush head, and the vibration will not be obstructed by other components during the transmission process. The vibration transmission has no attenuation or a small attenuation, so that the vibration frequency of the bristles is not affected or less affected. Compared with existing electric toothbrushes on the market, the vibration frequency of the bristles is higher. Overall, by using the electric toothbrush head, the vibration of driving shaft 10 can be directly transmitted to the brush head.

Referring to FIGS. 2-9, in present embodiment, a shell 4 and a plug 5 are further included. The shell 4 is a sleeve structure, and its upper end is fitted with the rod portion 3 and secured with the rod portion 3 in a clamped manner. The plug 5 is inserted into the lower end of the shell 4 and secured with the shell 4 in a clamped manner. The plug 5 is provided with a through hole 53 that runs up and down to connect to the groove 31 at the rod portion 3. The elastic arm 51 is provided on the plug 5, and the elastic arm 51 extends along an axis substantially parallel to a central axis of the through hole 53. The elastic arm 51 is inserted into the rod portion 3 and forms a partial side wall of the groove 31. The second limit portion 52 is provided on the side of the elastic arm 51 near the groove 31. When the driving shaft 10 (see FIG. 12) passes through the through hole 53 of the plug 5, and is inserted into the groove 31, the second limit portion 52 and the first limit portion 11 are fit with each other. By processing the elastic arm 51 and the rod portion 3 separately, and fixing the two parts through the shell 4 to form a whole, it not only meets the requirement of direct contact between the drive shaft 10 and the rod portion 3, but also reduces the difficulty of processing.

The first limit portion 11 and the second limit portion 52 fit with each other can limit the driving shaft 10 to move in the groove 31 of the rod portion 3 and to obstruct the driving shaft 10 from escaping from the rod portion 3. The driving shaft 10 is also limited by the inner wall of the groove 31 by being tightly fitted with the inner wall of the groove 31, to obstruct the driving shaft 10 to move in the groove 31 toward a direction perpendicular to an axis of the groove 31, such that vibration of the driving shaft 10 along the direction perpendicular to the axis of the groove 31 can directly be transmitted to the brush head.

The electric toothbrush head in the present invention is suitable for various types of electric toothbrushes, and the electric toothbrush head can be detached and replaced from the driving shaft of the electric toothbrush. In addition, the present invention does not specify the specific structure and detachable connection method of the first limiting portion 11 and the second limiting portion 52, such as a snap fit connection or tight fit with damping can be used in the present invention. In present embodiment, the first limiting portion 11 has spaced concave and convex, and the second limiting portion 52 also has spaced concave and convex, when the driving shaft 10 is inserted in the groove 31, the first limiting portion 11 and the second limiting portion 52 are fit with each other by the concave and the convex are matched with each other, and the first limiting portion 11 and the second limiting portion 52 can be detached by a little greater pulling-out force.

The shell 4 and the rod portion 3, as well as the shell 4 and the plug 5, can also be connected by a tight fit with damping, or by a snap fit connection. Referring to FIGS. 2-11, in this embodiment, in order to stably connect the shell 4 and the rod portion 3, as well as the shell 4 and the plug 5, the inner wall of the shell 4 is provided with a first engaging protrusion 410 and a first engaging groove 411 (see FIG. 11), the lower part of the rod portion 3 is provided with an elastic wall 32 extending parallel to a central axis the rod portion 3, and the elastic wall 32 is provided with a second engaging groove 320 matched with the first engaging protrusion 410. The first engaging protrusion 410 engages with the second engaging groove 320 to fix the shell 4 on the rod portion 3. The outer wall of the plug 5 is provided with a second engaging protrusion 57 matched with the first engaging groove 411. The first engaging groove 411 is engaged with the second engaging protrusion 57 to fix the plug 5 inside the shell 4. In present embodiment, the rod portion 3 is made of plastic material, when the rod portion 3 is inserted into the shell 4 from top to bottom, the elastic wall 32 will elastically deform inward and cross the first engaging protrusion 410 on the inner wall of the shell 4, and when the second engaging groove 320 reaches the position of the first engaging protrusion 410, the elastic wall 32 will stop deformation and rebound to allow the second engaging groove 320 to engage with the first engaging protrusion 410, and at the same time, the second engaging protrusion 57 will also engage with the first engaging groove 411.

Figure 6:
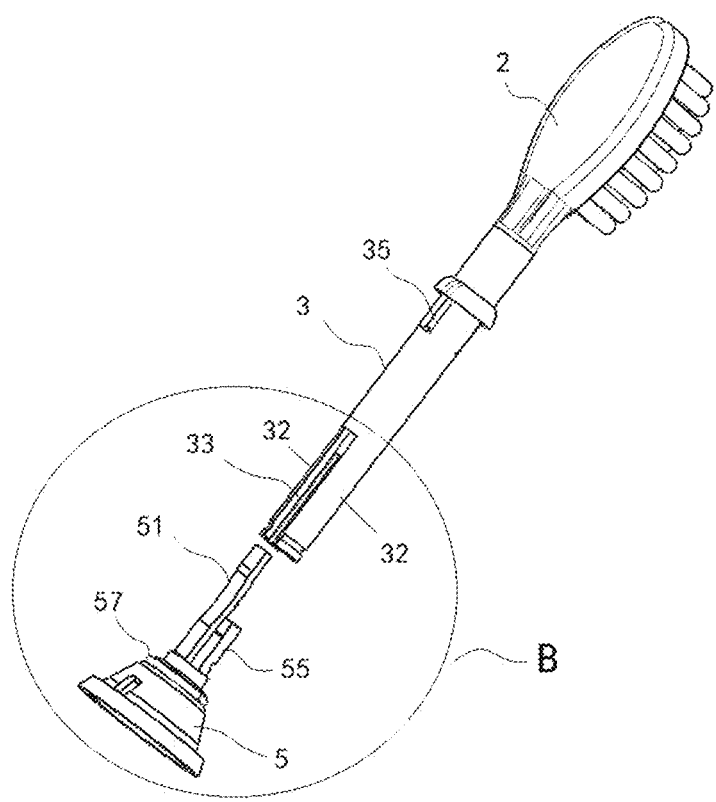
FIG. 6 is an exploded view of the electric toothbrush head of FIG. 5.
Figure 7:
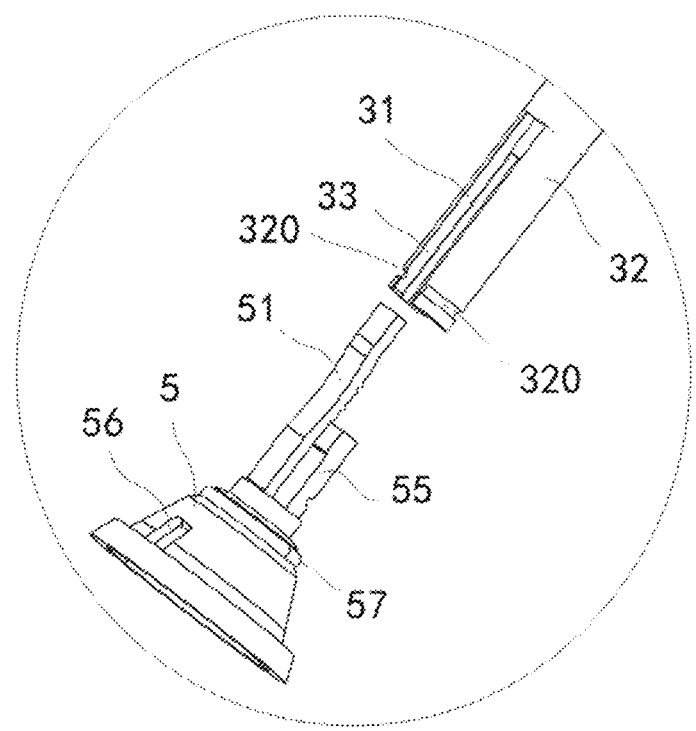
FIG. 7 is an enlarged view of B part of the electric toothbrush head of FIG. 1.
Figure 8:
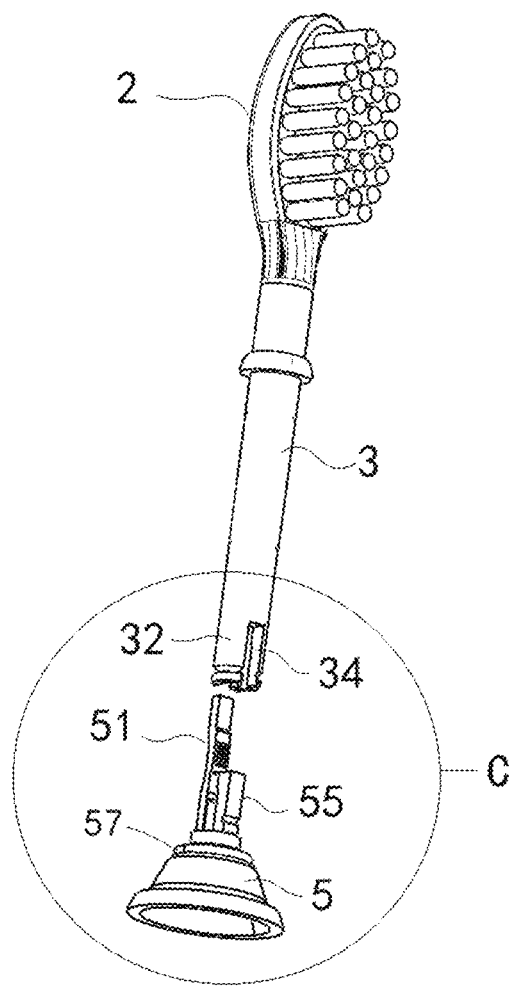
FIG. 8 is another exploded view of the electric toothbrush head of FIG. 5.
Figure 9:
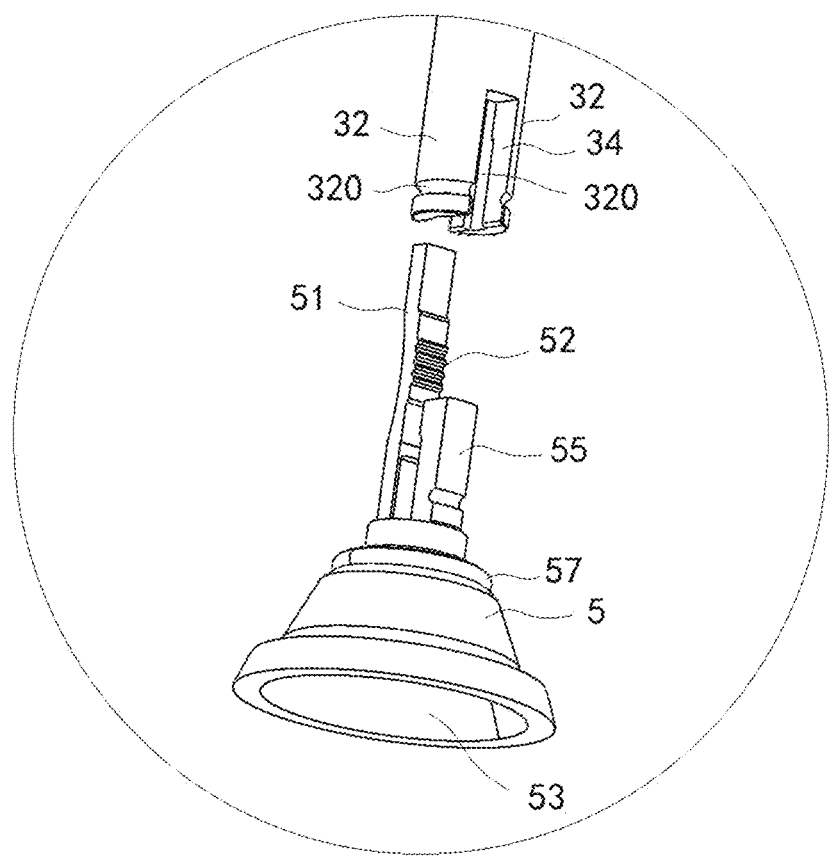
FIG. 9 is an enlarged view of C part of the electric toothbrush head of FIG. 8.
Figure 10:
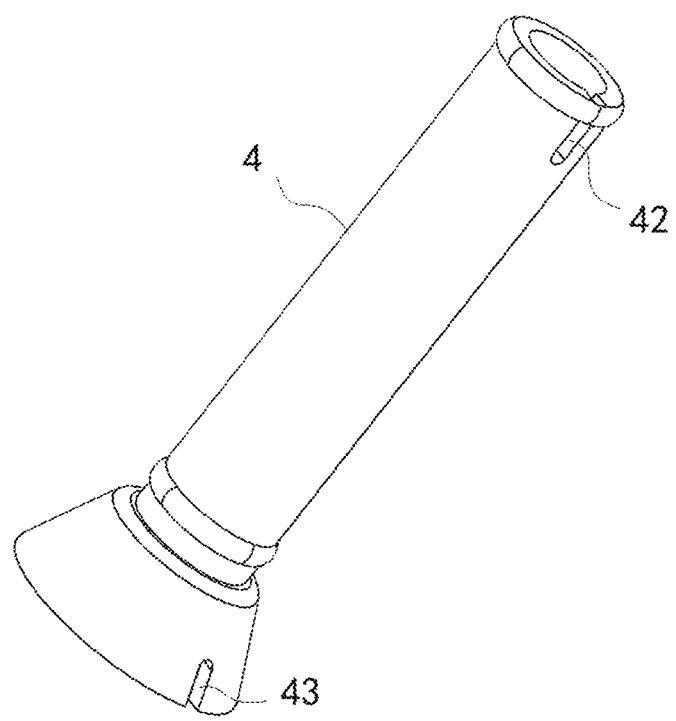
FIG. 10 is a schematic structural view of an outer shell used in the electric toothbrush head of FIG. 1.
Figure 11:
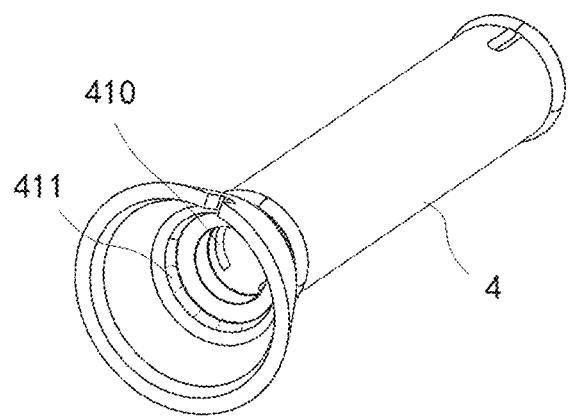
FIG. 11 is another schematic structural view of the outer shell of FIG. 10.
Figure 12:
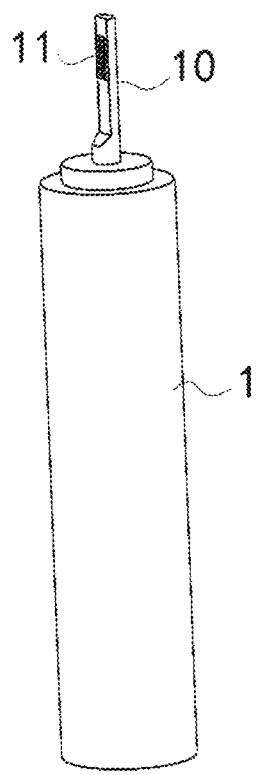
FIG. 12 is a schematic structural view of a driving shaft on a handle of an electric toothbrush according to an embodiment of present invention.

Furthermore, referring to FIGS. 6-8, in order to achieve the formation of a partial side wall of the groove 31 by the elastic arm 51, the side wall of the rod portion 3 is provided with a first opening 33, the first opening 33 is in communication with the groove 31. The elastic arm 51 is inserted into the first opening 33 to form partial side wall of the groove 31, so that when the driving shaft 10 is inserted into the groove 31, the elastic arm 51 undergoes elastic deformation in the first opening 33, thereby facilitating the engagement of the first limit portion 11 and the second limit portion 52.

Due to the fact that the first opening 33 is located on the side wall of the rod portion 3, and the elastic arm 51 is inserted into the first opening 33, and the elastic arm 51 and the other side walls of the rod portion 3 cooperatively surrounds the groove 31, when the driving shaft 10 inserts into the groove 31 to drive the rod portion 3 to vibrate, the contact area of the driving shaft 10 except for the part in contact with the elastic arm 51 is the side wall of the rod portion 3, so that the driving shaft 10 can contact the rod portion 3 as much as possible, further reducing vibration losses. In addition, when the elastic arm 51 is inserted into the first opening 33, it compensates for the first opening 33 and forms a whole with the rod portion 3. When the driving shaft 1 drives the rod portion 3 to vibrate, the elastic arm 51 and the rod portion 3 constrain each other. It also reduces vibration losses and enhances the strength of the elastic arm 51, making it less prone to breakage.

Figure 4:
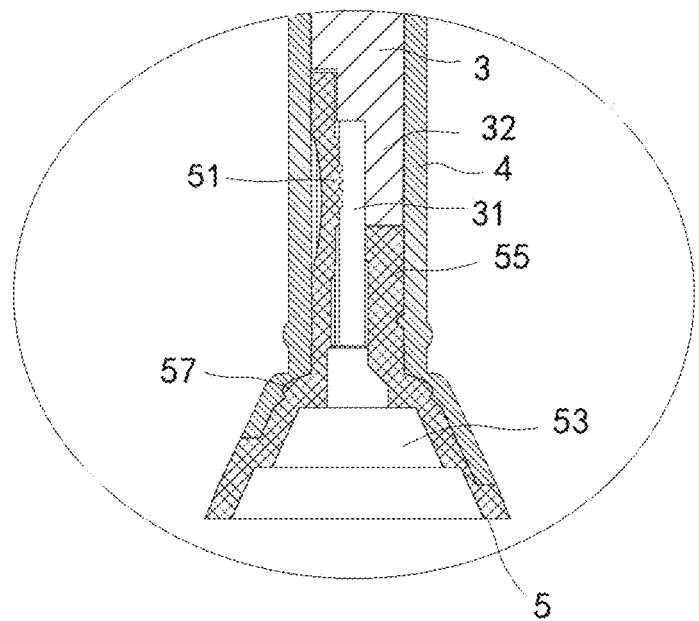
FIG. 4 is an enlarged view of A part of the electric toothbrush head of FIG. 3.
Figure 5:
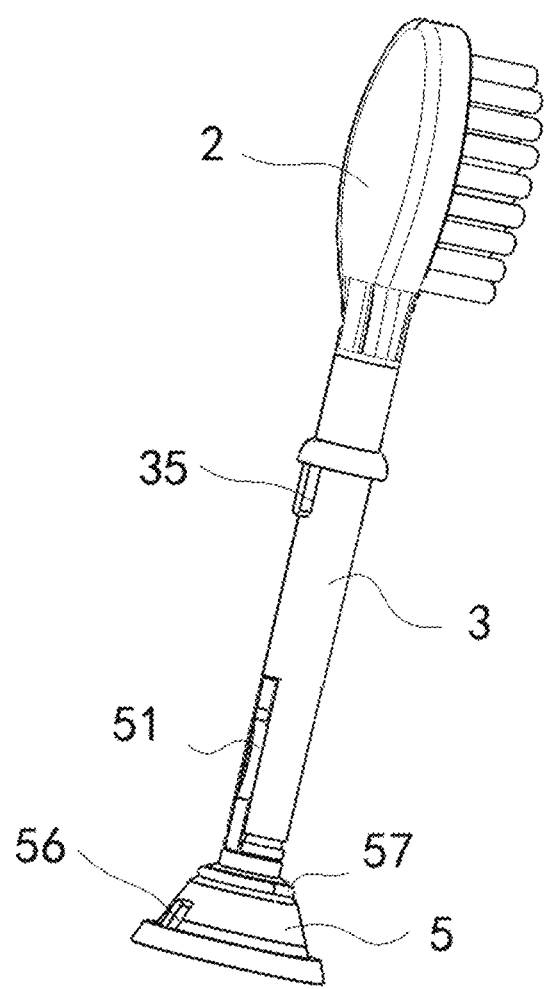
FIG. 5 is a partial view of the electric toothbrush head of FIG. 1, by removing the shell to show a connection between the rod portion and the plug.

Furthermore, referring to FIG. 4, the elastic arm 51 bends and protrudes towards the groove 31. When the driving shaft 10 is inserted into the groove 31, it can contact and compress the elastic arm 51, and the elastic arm 51 generates a rebound force to press the driving shaft 10, thereby making the driving shaft 10 more tightly matched with the groove 31.

Furthermore, referring to FIGS. 6-8, the side wall of the rod portion 3 is also provided with a second opening 34, the second opening 34 is also in communication with the groove 31, so that the lower part of the rod portion 3 becomes two opposite side walls, and the two side walls are the elastic walls 32, and the channel between the elastic walls 32 is the groove 31. By dividing the side wall of the rod portion 3 into two elastic walls 32 through the first opening 33 and the second opening 34, elastic deformation of the elastic walls 32 can thus be formed. Both elastic walls 32 are provided with the second engaging groove 320, which provide two secured points for the connection between the rod portion 3 and the shell 4, making the connection between the two more stable. Preferably, for uniform force distribution, the first opening 33 and the second opening 34 are arranged opposite each other on both sides of the groove 31.

To further enhance the integrity of the plug 5 and the rod portion 3, the plug 5 is also equipped with a clamping column 55 substantially parallel to a central axis thereof. The clamping column 55 extends into the second opening 34, filling the second opening 34 and forming a part of the side wall of the groove 31. This further strengthens the integrity of the connection between the plug 5 and the rod portion 3. When the driving shaft 10 drives the rod portion 3 to vibrate, the clamping column 55 and the rod portion 3 constrain each other, reducing vibration losses and strengthening the strength of the clamping column 55, making it less likely to break. In addition, the clamping column 55 restricts the inward deformation of the two elastic walls 32, thereby avoiding the problem of the elastic walls 32 deforming and causing the shell 4 to be pulled out when external forces act on the shell, thereby strengthening the connection between any two of the plug 5, the rod portion 3, and shell 4.

Furthermore, the length of the second opening 34 in the axial direction of the rod portion 3 is less than the length of the first opening 33 in the axial direction of the rod portion 3. This ensures that the elastic walls 32 can undergo elastic deformation while maintaining the contact area between the side wall of the rod portion 3 and the drive shaft 10, further reducing the attenuation of vibration transmission.

Furthermore, the elastic arm 51 is inserted into the first opening 33, and the clamping column 55 extends into the second opening 34 to clamp the elastic wall 32 and prevent deformation and loosening of the elastic wall 32, thereby preventing the elastic wall 32 from detaching from the first engaging protrusion 410.

Due to the wrapping of the plug 5 and the rod portion 3 by the shell 4, the elastic arm 51 is in a visual blind spot when inserted into the rod portion 3. To avoid installation errors, referring to FIGS. 1, 2, 10, and 11, in present implementation, the side wall of the rod portion 3 is provided with a first positioning protrusion 35, and the side wall of the shell 4 is provided with a first positioning groove 42 that matches the first positioning protrusion 35. When the rod portion 3 is inserted into the shell 4, the first positioning protrusion 35 is inserted into the first positioning groove 42, so that the first opening 33 is positioned at a predetermined and unique position in the shell 4.

Furthermore, the side wall of the plug 5 is provided with a second positioning protrusion 56, and the side wall of the shell 4 is provided with a second positioning groove 43 that matches the second positioning protrusion 56. When the plug 5 is inserted into the shell 4, the second positioning protrusion 56 is inserted into the second positioning groove 43, so that the elastic arm 51 is positioned at a predetermined and unique position in the shell 4.

In present embodiment, the first positioning protrusion 35, the first positioning groove 42, the second positioning protrusion 56, and the second positioning groove 43 are all on the same straight line. During installation, simply align the first positioning protrusion 35 with the first positioning groove 42 and insert the rod 3 into the shell 4. Then align the second positioning protrusion 56 with the second positioning groove 43 and insert the plug 5 into the shell 4 to ensure that the elastic arm 51 is inserted into the first opening 33.

Figure 13:
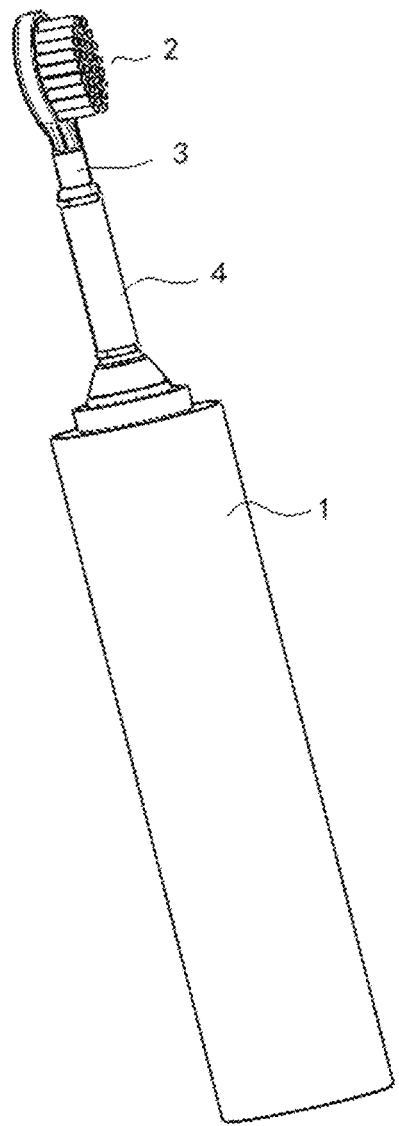
FIG. 13 is a schematic structural view of an electric toothbrush according to an embodiment of present invention.

The embodiment of the present invention also discloses an electric toothbrush, as shown in FIG. 13. The electric toothbrush comprises a handle 11 and an electric toothbrush brush head as described above. The driving shaft 10 is provided on the handle 11, and the electric toothbrush brush head is connected to and driven by the driving shaft 10.

It should be noted that the terms used here are only for describing specific embodiments, and are not intended to limit exemplary embodiments according to this application. As used here, unless otherwise explicitly stated in the context, the singular form is also intended to include the plural form. In addition, it should be understood that when the terms of including and/or including are used in this specification, they indicate the existence of features, steps, operations, devices, components, and/or their combinations.

In addition, it should be noted that the use of words such as first and second to define components is only for the purpose of distinguishing the corresponding components. Unless otherwise stated, the above words have no special meaning and cannot be understood as limiting the scope of protection of this application.

Although embodiments of the present invention have been shown and described, it can be understood by those skilled in the art that multiple variations, modifications, substitutions, and variations can be made to these embodiments without departing from the principles and spirit of the present invention. The scope of the present invention is limited by the accompanying claims and their equivalents.

What is claimed is:

1. An electric toothbrush brush head for connecting a driving shaft of an electric toothbrush, the driving shaft having a first limiting portion, the electric toothbrush brush head comprising:
 a head portion with bristles;
 a rod portion extending from the head portion a distance between the head portion and the driving shaft; the rod portion comprising a groove; and
 a plug engaged with the rod portion, the plug comprising a through hole in communication with the groove, and an elastic arm, the elastic arm forming partial side wall of the groove, and the elastic arm having a second limiting portion configured for matching with the first limiting portion in a manner that when the driving shaft passes through the through hole of the plug and is inserted in the groove, the first limiting portion is fitted with second limiting portion.

2. The electric toothbrush brush head according to claim 1, wherein the first limiting portion, the second limiting portion and the groove cooperatively forms a limit for obstructing the driving shaft to move in the groove.

3. The electric toothbrush brush head according to claim 1, further comprising a shell sleeved outside of the rod portion and secured with the rod portion, an upper end of the shell is spaced from the head portion, and the plug is inserted into a lower end of the shell and secured with the shell.

4. The electric toothbrush brush head according to claim 3, wherein the shell comprises a first engaging protrusion and a first engaging groove, the rod portion comprises a second engaging groove engaging with the first engaging protrusion, and the plug comprises a second engaging protrusion engaging with the first engaging groove, thereby the shell is secured to the rod portion, and the plug is secured to the shell.

5. The electric toothbrush brush head according to claim 3, wherein the rod portion comprises a first opening in communication with the groove, the elastic arm is inserted in the first opening to form the partial side wall of the groove.

6. The electric toothbrush brush head according to claim 5, wherein the rod portion comprises a second opening in communication with the groove, the plug further comprises a clamping column, the clamping column is inserted in the second opening and forms partial side wall of the groove, thereby strengthening the connection between any two of the plug, the rod portion and the shell.

7. The electric toothbrush brush head according to claim 6, wherein the rod portion comprises two opposite elastic walls surrounding the groove, and located between the first opening and the second opening, the elastic wall provides elasticity when the rod portion is assembled to the shell, the clamping column clamps the elastic walls and prevents deformation and loosening of the elastic walls.

8. The electric toothbrush brush head according to claim 7, wherein a length of the second opening in an axial direction of the rod portion is less than a length of the first opening in the axial direction of the rod portion, to allow the elastic walls undergo elastic deformation while maintaining a contact with the drive shaft.

9. The electric toothbrush brush head according to claim 1, wherein the elastic arm bends and protrudes towards the groove to form an elastic and tight contact with driving shaft.

10. The electric toothbrush brush head according to claim 5, wherein a side wall of the rod portion is provided with a first positioning protrusion, and a side wall of the shell is provided with a first positioning groove matching with the first positioning protrusion, when the rod portion is inserted into the shell, the first positioning protrusion is inserted into the first positioning groove, thereby the first opening is positioned at a predetermined position in the shell.

11. The electric toothbrush brush head according to claim 10, wherein a side wall of the plug is provided with a second positioning protrusion, and a side wall of the shell is provided with a second positioning groove matching with the second positioning protrusion, when the plug is inserted into the shell, the second positioning protrusion is inserted into the second positioning groove, thereby the elastic arm is positioned at a predetermined position in the shell.

12. The electric toothbrush brush head according to claim 9, wherein the elastic arm is a single strip formed on a body of the plug.

13. An electric toothbrush, comprising a handle having a driving shaft, and an electric toothbrush brush head according to claim 1, wherein the electric toothbrush head is connected to and driven by the driving shaft.

14. An electric toothbrush brush head for connecting a driving shaft of an electric toothbrush, comprising:
 a head portion with bristles;
 a rod portion extending from the head portion; the rod portion comprising a groove;
 a shell spaced from the head portion, the shell sleeved outside of the rod portion and secured with the rod portion; and
 a plug inserted into a lower end of the shell and secured with the shell, the plug comprising a through hole in communication with the groove, and an elastic arm, the elastic arm being a single strip formed on a body of the plug, and the elastic arm bending and protruding towards the groove, the elastic arm forming partial side wall of the groove, the groove configured for being directly connected to the driving shaft passing through the through hole, and the groove and the elastic arm cooperatively forms a limit for obstructing the driving shaft to move in the groove.

15. The electric toothbrush brush head according to claim 14, wherein the rod portion in integrally formed with head portion.

16. The electric toothbrush brush head according to claim 14, wherein the shell comprises a first engaging protrusion and a first engaging groove, the rod portion comprises a second engaging groove engaging with the first engaging protrusion, and the plug comprises a second engaging protrusion engaging with the first engaging groove, thereby the shell is secured to the rod portion, and the plug is secured to the shell.

17. The electric toothbrush brush head according to claim 14, wherein the rod portion comprises a first opening and a second opening in communication with the groove, the elastic arm is inserted in the first opening to form the partial side wall of the groove, the plug further comprises a clamping column, and the clamping column is inserted in the second opening and forms partial side wall of the groove, thereby strengthening the connection between any two of the plug, the rod portion and the shell.

18. The electric toothbrush brush head according to claim 17, wherein the clamping column is spaced from the elastic arm, and a length of the elastic arm is greater than that of the clamping column.

\* \* \* \* \*